United States Patent
Krompaß et al.

(10) Patent No.: US 11,468,274 B2
(45) Date of Patent: Oct. 11, 2022

(54) DATA DRIVEN METHOD FOR AUTOMATED DETECTION OF ANOMALOUS WORK PIECES DURING A PRODUCTION PROCESS

(71) Applicant: SIEMENS AKTIENGESELLSCHAFT, Munich (DE)

(72) Inventors: Denis Krompaß, Munich (DE); Hans-Georg Köpken, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 954 days.

(21) Appl. No.: 16/211,370

(22) Filed: Dec. 6, 2018

(65) Prior Publication Data

US 2019/0180152 A1    Jun. 13, 2019

(30) Foreign Application Priority Data

Dec. 13, 2017   (EP) ..................................... 17206972

(51) Int. Cl.
*G06K 9/22*   (2006.01)
*G05B 19/41*  (2006.01)
(Continued)

(52) U.S. Cl.
CPC ..... *G06K 9/6277* (2013.01); *G05B 19/41875* (2013.01); *G06K 9/6284* (2013.01); *G05B 2219/32193* (2013.01)

(58) Field of Classification Search
CPC .......................... G06K 9/6277; G05B 19/41875
(Continued)

(56) References Cited

U.S. PATENT DOCUMENTS 6,456,899 B1    9/2002  Gleason et al.
2007/0071308 A1*  3/2007 Nakatani ............... G03F 7/7065
                                                382/149
(Continued)

FOREIGN PATENT DOCUMENTS

CN   101943896 A   1/2011
CN   103810374 A   5/2014
(Continued)

OTHER PUBLICATIONS

Office Action in corresponding Japanese Patent Application No. 2018-220292 dated Apr. 28, 2020. 18 pages.
(Continued)

*Primary Examiner* — Jeffery A Williams
(74) *Attorney, Agent, or Firm* — Schmeiser, Olsen & Watts LLP (57) ABSTRACT

Provided is a method and system for detection of anomalous work pieces that includes computing at least one deviation data signal for a target data signal of a target work piece with respect to reference data signals recorded for a corresponding production process step of a set of reference work pieces, performing a stepwise anomaly detection by data processing of the at least one computed deviation data signal and a process type indicator indicating a type of the production process step using a trained anomaly detection data model to calculate for each time step or path length step of the production process step an anomaly probability that the respective time step or path length step is anomalous, and classifying the target work piece and/or the production process step as being anomalous or not anomalous on the basis of the calculated anomaly probabilities.

15 Claims, 4 Drawing Sheets

(51) Int. Cl.
*G06K 9/62* (2022.01)
*G05B 19/418* (2006.01)

(58) Field of Classification Search
USPC .......................................................... 702/82
See application file for complete search history.

(56) References Cited

U.S. PATENT DOCUMENTS

| | | |
|---|---|---|
| 2011/0301743 A1 | 12/2011 | Yamada |
| 2016/0097728 A1 | 4/2016 | Engelbart et al. |
| 2017/0032281 A1 | 2/2017 | Hsu |
| 2017/0188971 A1 | 7/2017 | Liu et al. |
| 2017/0255669 A1 | 9/2017 | Ronen et al. |

FOREIGN PATENT DOCUMENTS

| | | |
|---|---|---|
| CN | 104394405 A | 3/2015 |
| JP | 2002324109 A | 11/2002 |
| JP | 2006302096 A | 11/2006 |
| JP | 2011242923 A | 12/2011 |
| JP | 2013025367 A | 2/2013 |
| JP | 2014115714 A | 6/2014 |
| JP | 2016075663 A | 5/2016 |
| JP | 2016201088 A | 12/2016 |
| JP | 2017123170 A | 7/2017 |

OTHER PUBLICATIONS

Extended European Search Report dated Apr. 6, 2018 for Application No. 17206972.6.
Office Action in related Chinese Patent Application No. 201811524434.6 dated Sep. 6, 2021. 15 pages.
Zhangjun, Yao, "The study and implementation of data collection and analysis in dependable monitoring system," 2013; 84 pages. English Abstract.
Xiujuan, Yu, "Research on Prediction and Diagnosis Method of Processing Quality Abnormalities," 2011; 94 pages. English Abstract.

\* cited by examiner

DATA DRIVEN METHOD FOR AUTOMATED DETECTION OF ANOMALOUS WORK PIECES DURING A PRODUCTION PROCESS

CROSS REFERENCE TO RELATED APPLICATIONS

This application claims priority to European application No. 17206972.6, having a filing date of Dec. 13, 2017, the entire contents of which are hereby incorporated by reference.

FIELD OF TECHNOLOGY

The following relates to a data driven method for automated detection of anomalous work pieces during a production process and in particular a data driven method for automated detection of anomalous work pieces by a quality control system of a production facility.

BACKGROUND

Monitoring the quality of a running production in a production facility is essential to deliver and guarantee stable quality of manufactured products. In high-quantity and mass production processes, it is almost impossible to perform an extensive quality control on every single manufactured product delivered to a customer. In most cases, a two-level quality control is performed. In a first quality control level, a shallow quality control is performed, often by a machine operator, to get high coverage, however, with a lack in precision. In a second quality control level, a scheduled in-depth quality control by dedicated personnel can be performed to get a high precision control with less coverage. The time interval in which the second level control is triggered has normally emerged from experience and lessons learned with respect to the manufactured product, the manufacturing machines as well as the material involved in the manufacturing process. Even though this conventional approach has been best practice for decades, it does not come without flaws. First, from the second level control, there exists only knowledge about a small sample of controlled work pieces. As a consequence, it has to be assumed that any deficiencies that are measured on the small sample of controlled work pieces can also be measured on the whole production output since the last scheduled quality control. In that case, either additional personnel has to be acquired to search and control the work pieces of hours of production to find the first manufactured work piece which has the observed deficiencies, or if not feasible, the whole production output of the production process in doubt has to be discarded as scrap. Second, an in-depth quality control is equipped to measure expected deficiencies and is reactive, meaning that it adapts in response to customer feedback. Third, the conventional current quality control system relies on the assumption that non-obvious deficiencies on work pieces occur in series and not as singletons. Fourth, the conventional quality control method is a completely human driven process where the quality of control naturally varies with the experience and enthusiasm of the individual person as well as its form of the day.

SUMMARY

An aspect relates to provide a method for automated detection of anomalous work pieces during a production process which overcomes the above-mentioned drawbacks and which provides an effective and reliable quality control.

The embodiment of the invention provides according to the first aspect of the present embodiment a data driven method for automated detection of anomalous work pieces during a production process, the method comprising:
computing for each production process step of the production process at least one deviation data signal for a target data signal of a target work piece with respect to reference data signals recorded for a corresponding production process step of a set of reference work pieces,
wherein the deviation data signal comprises a number of deviation data samples for different production time steps, t, or path length steps, l, of the respective production process step;
performing a stepwise anomaly detection by data processing of the at least one computed deviation data signal and a process type indicator indicating a type of the production process step using a trained anomaly detection data model to calculate for each time step, t, or path length step, l, of the production process step an anomaly probability, p, that the respective time step, t, or path length step, l, is anomalous; and
classifying the target work piece and/or the production process step as being anomalous or not anomalous on the basis of the calculated anomaly probabilities, p, of the time steps, t, or path length steps, l, of the production process step.

In a possible embodiment of the method according to the first aspect of the present invention, measurement data of the production process step are recorded as time step, t, and/or path length step, l, based measurement data with a varying number of data samples per target work piece and/or process step.

In a possible embodiment of the method according to the first aspect of the present invention, recorded time step based measurement data are converted into three-dimensional path length based data by projecting the time step based measurement data on a path length, L, along a trajectory common to all work pieces during the production process step.

In a further possible embodiment of the method according to the first aspect of the present invention, the three-dimensional path length based data are smoothed by a data filter to provide the target data signal of the target work piece and reference data signals of reference work pieces.

In a further possible embodiment of the method according to the first aspect of the present invention, the deviation data signal is computed by calculating a normalized Euclidian distance between the smoothed target data signal of the target work piece output by the data filter and a signal mean and standard deviation of the recorded reference data signals for a moving window having a predetermined window size.

In a further possible embodiment of the method according to the first aspect of the present invention, an error of the calculated anomaly probability is minimized by optimizing network parameters of the anomaly detection data model using a calculated binary cross entropy loss.

In a still further possible embodiment of the method according to the first aspect of the present invention, the automated detection of anomalous work pieces and/or anomalous production process steps is performed in real time during the running production process comprising the process steps.

In a still further possible embodiment of the method according to the first aspect of the present invention, the anomaly detection data model comprises a dilated convolution based data model.

In a still further possible embodiment of the method according to the first aspect of the present invention, the anomaly detection data model comprises a recurrent neural network, in particular a Long-Term-Short-Term, LSTM, network, or a gated recurrent unit, GRU, network.

In a further possible embodiment of the method according to the first aspect of the present invention, if the target work piece and/or the production process step is classified as anomalous, a warning signal for a user and/or a control signal for a production machine is generated automatically.

The embodiment of the invention further provides according to a second aspect a quality control system.

The embodiments of the invention provides according to the second aspect a quality control system comprising
an input interface adapted to receive a target data signal of a target work piece processed in a production process by a production machine,
a data preprocessing unit adapted to compute for each production process step of the production process at least one deviation data signal for the received target data signal with respect to reference data signals recorded for a corresponding production process step of a set of reference work pieces,
wherein the deviation data signal comprises a number of deviation data samples for different production time steps, t, or path length steps, l, of the respective production process step,
an anomaly detection unit adapted to perform a stepwise anomaly detection by data processing of the at least one deviation data signal and a process type indicator indicating a type of the production process step using a trained anomaly detection data model to calculate for each time step, t, and/or path length step, l, of the production process step an anomaly probability, p, that the respective time step, t, and/or path length step, l, is anomalous,
a classification unit adapted to classify the target work piece and/or the production process step as being anomalous or not anomalous on the basis of the calculated anomaly probabilities, p, of the time steps, t, and/or path length steps, l, of the production process step, and
an output interface adapted to issue a generated warning signal and/or a generated control signal, if the target work piece and/or the production process step is classified by the classification unit as anomalous.

In a possible embodiment of the quality control system according to the second aspect of the present invention, the reference data signals recorded for a corresponding production process step for a set of reference work pieces are stored in a memory read by the data preprocessing unit to compute for each production process step of the production process at least one deviation data signal supplied to the anomaly detection unit.

In a still further possible embodiment of the quality control system according to the second aspect of the present invention, the target data signal of a target work piece processed in the production process comprises measurement data generated by the sensors of the production machine.

In a further possible embodiment of the quality control system according to the second aspect of the present invention, the measurement data is provided by a data extraction pipeline of the production machine and recorded on a time base scale per work piece and per process step of the production process.

In a still further possible embodiment of the quality control system according to the second aspect of the present invention, the data preprocessing unit is adapted to convert recorded time step based measurement data into three-dimensional path length based data by projecting the time step based measurement data on a path length, L, along a trajectory common to all work pieces during the production process step of the production process.

BRIEF DESCRIPTION

Some of the embodiments will be described in detail, with reference to the following figures, wherein like designations denote like members, wherein.

DETAILED DESCRIPTION

Figure 1:
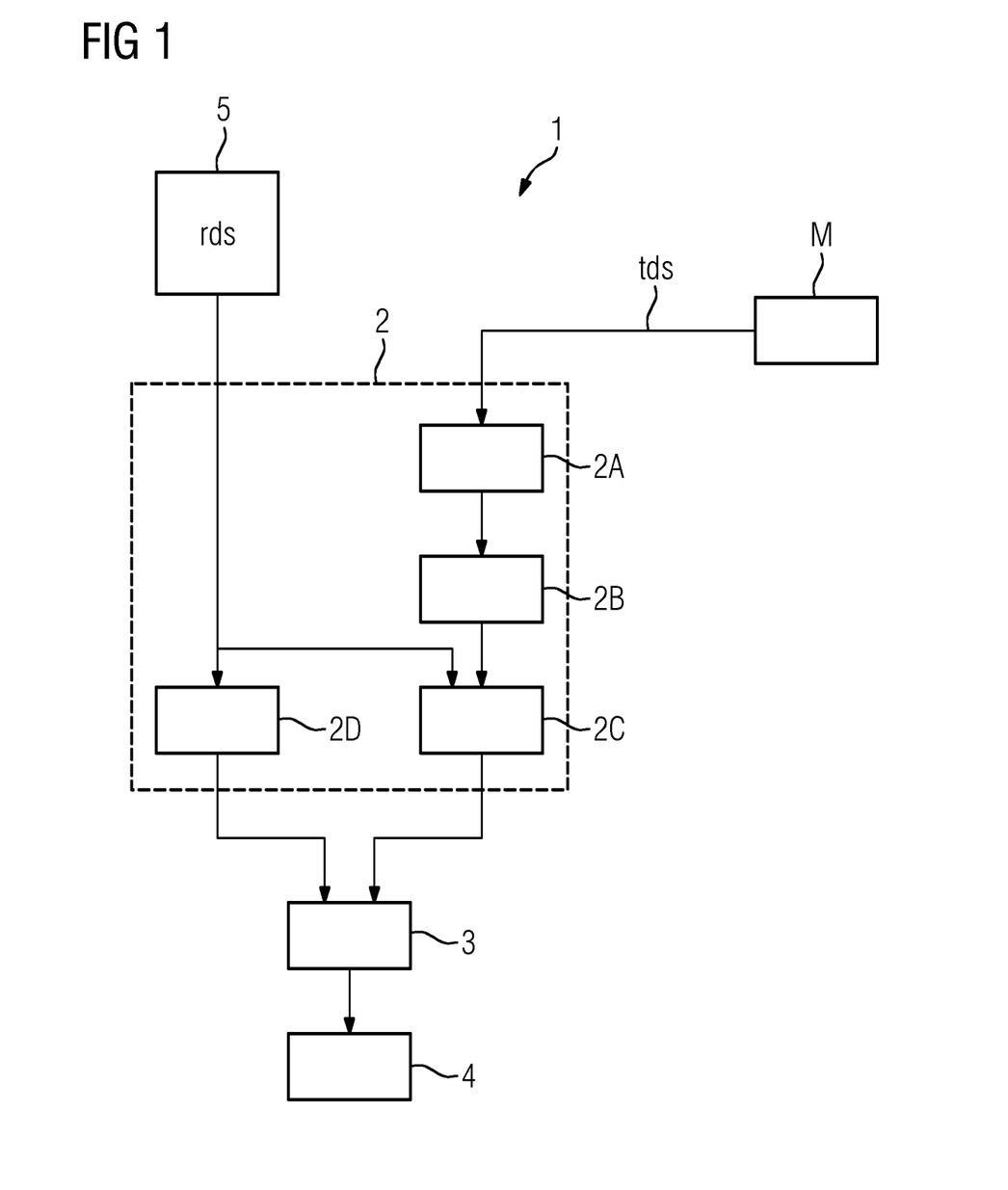
FIG. 1 shows a block diagram for illustrating a possible exemplary embodiment of a quality control system.

As can be seen in FIG. 1, a quality control system 1 according to an aspect of the embodiment of the present invention comprises in the illustrated exemplary embodiment a data preprocessing unit 2 having an input interface to receive a target data signal. The input interface can for instance be connected to a controller of a production machine M adapted to process a work piece in a production process comprising several production process steps. The production or manufacturing machine M can be connected via a signal line or a signal bus to the input interface of the data preprocessing unit 2. The production machine M can process one or more work pieces in a current production process step forming part of a production process performed by the respective manufacturing machine M. For instance, a work piece can be processed by a milling and boring machine. The manufacturing machine M can perform a manufacturing or production process comprising a series of process steps such as roughing or finishing or polishing the work piece. The data preprocessing unit 2 comprises at least input interface adapted to receive a target data signal of a target work piece processed in a production process by the production machine M. The target data signal comprises data concerning the work piece undergoing the current production process step. The target data signal can comprise measurement or sensor data generated by sensors of the manufacturing machine M and supplied to the data input interface of the data preprocessing unit 2 of the quality control system 1.

The data preprocessing unit 2 is adapted to compute for each production process step of the production process at least one deviation data signal for the received target data signal with respect to reference data signals recorded for a corresponding production process step of a set of reference work pieces. The recorded reference data signals can be read in a possible embodiment from a memory 5 of the quality control system 1. The reference data signals read from the memory 5 or database are preprocessed data stored for previously processed reference work pieces showing a high quality. The deviation data signal computed by the data preprocessing unit 2 comprises a number of deviation data samples for different production time steps t and/or path length steps l of the respective production process step performed by the production machine M. The quality control system 1 further comprises an anomaly detection unit 3 connected to the data preprocessing unit 2. The anomaly detection unit 3 is adapted to perform a stepwise anomaly detection by data processing of the at least one deviation data signal output by the data preprocessing unit 2 and a process type indicator PTI indicating a type of the production process step using a trained anomaly detection data model to calculate for each time step t and/or a path length step l of the production process step an anomaly probability p that the respective time step t and/or path length step l is anomalous.

The quality control system 1 further comprises a classification unit 4 adapted to classify the target work piece and/or the production process step performed by the manufacturing machine M as being anomalous or not anomalous on the basis of the calculated anomaly probabilities p of the time steps t and/or path length steps l of the respective production process step. The classification unit 4 comprises in a possible embodiment an output interface adapted to issue a generated warning signal and/or a generated control signal, if the target work piece and/or the current production process step is classified by the classification unit 4 as being anomalous. In a possible embodiment, the classification unit 4 can generate control signals applied to the manufacturing machine M, if the work piece and/or the production process step has been classified as being anomalous. In a possible embodiment, the quality control system 1 comprising the data preprocessing unit 2, the anomaly detection unit 3 and the classification unit 4 is connected to one or several production manufacturing machines M of a production facility via a signal bus for bidirectional communication comprising data signals and/or control signals. Accordingly, if the classification unit 4 classifies a target work piece and/or a production process step of the production process as anomalous, the quality control system 1 can immediately take countermeasures to increase the quality of the work pieces or at least warn a user that a current target work piece and/or a current production process step is anomalous.

As illustrated in the embodiment of FIG. 1, the data preprocessing unit 2 has access to a data memory or a database 5 storing preprocessed reference data for a set of reference work pieces. The memory 5 can be a local or a remote memory connected e.g. to the data preprocessing unit 2 via a network. The reference data signals recorded for the corresponding production process step for a set of reference work pieces are stored in the memory 5 and can be read by the data preprocessing unit 2 during the production process to compute for each production process step of the production process at least one deviation data signal supplied to the anomaly detection unit 3 of the control system 1. The target data signal of a target work piece processed by the production machine M in the production process can comprise measurement data generated by sensors of the production machine M. The measurement data can be provided by a data extraction pipeline of the production machine M and recorded on a time base scale per target work piece and per process step of the production process. The data preprocessing unit 2 of the quality control system 1 is adapted to convert recorded time step based measurement data into three-dimensional path length based data by projecting the time step based measurement data on a path length L along a trajectory common to all work pieces during the production process step of the production process.

Figure 4:
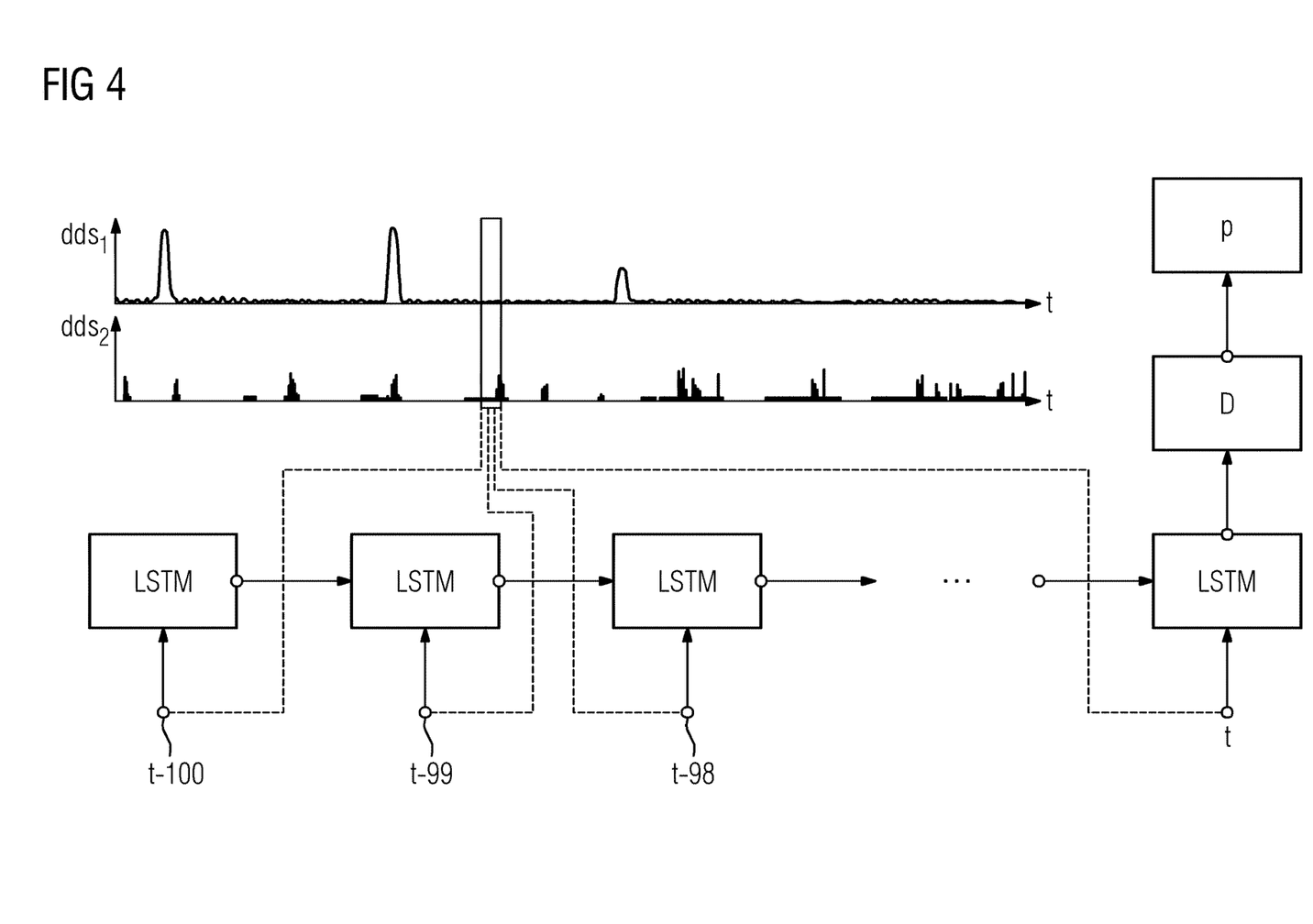
FIG. 4 shows a diagram for illustrating a possible exemplary embodiment of a method and system.

As illustrated in the block diagram of FIG. 1, the data preprocessing unit 2 can perform the projection of the received target data in a first stage 2A on a three-dimensional path length L along a trajectory common to all work pieces during the production process step of the production process. The recorded time step based measurement data are converted in a possible embodiment into three-dimensional path length based data by projecting the time step based measurement data on the path length L along a trajectory common to the work pieces during the production process step performed by the production machine M. In a further stage 2B of the data preprocessing unit 2, the three-dimensional path length based data are smoothed by a data filter to provide the target data signal of the target work piece. Also, the reference data signals of the reference work pieces are smoothed by the data filter 2B before being stored in the data memory 5. The data preprocessing unit 2 further comprises a further calculation stage 2C adapted to calculate the deviation data signal supplied to the anomaly detection unit 3. In a possible embodiment, the deviation data signal calculation stage 2C of the data preprocessing unit 2 is adapted to compute or calculate a normalized Euclidian distance between the smoothed target data signal of the target work piece output by the data filter 2B and a signal mean and standard deviation of the recorded reference data signals for a moving window having a predetermined window size. In a further possible embodiment, the data preprocessing unit 2 of the quality control system 1 comprises an encode process type unit 2D which supplies a process type indicator PTI to the anomaly detection unit 3 as shown in FIG. 1. The process type indicator PTI can indicate a process type of a production process step within a sequence of process steps of a production process performed by the manufacturing machine M. For instance, if the manufacturing machine M is a milling machine, the production process can include as production process steps roughing of the work piece or finishing of the work piece. The process type indicator PTI indicates the type of the current production process step, e.g. indicating that the current production process step is a roughing production process step or a finishing production process step. The anomaly detection unit 4 performs a stepwise anomaly detection by processing the received deviation data signal and the received process type indicator PTI using a trained anomaly detection data model to calculate for each time step t and/or path length step l of the current production process step an anomaly probability p that the respective time step t and/or path length step l is anomalous. The anomaly detection unit 3 can use different kinds of anomaly detection data models. In a possible embodiment, the anomaly detection data model used by the anomaly detection unit 3 comprises a dilated convolution based data model. In an alternative embodiment, the anomaly detection data model used by the anomaly detection unit 3 can comprise a recurrent neural network RNN. In a possible embodiment, the recurrent neural network RNN can comprise a long-term short-term LSTM network, as also illustrated in FIG. 4 or a gated recurrent unit GRU network. The classifying unit 4 classifies the current target work piece and/or the current production process step as being anomalous or not anomalous on the basis of the calculated anomaly probabilities p received from the anomaly detection unit 3. The automated detection of anomalous work pieces and/or anomalous production process steps is performed by the quality control system 1 during the running production process comprising the process steps in real time. The production or manufacturing machine M can comprise one or several machine tools for performing different kinds of production process steps such as polishing, finishing or roughing of the work piece. The same machine tool can be used for different production process steps. It is also possible that machine tools are exchanged between different production process steps of the production process. The production machine or manufacturing machine M can be equipped with a large set of sensors which can be used to monitor the machine and machining state during the production process. Further, the measured data can be stored and preprocessed and stored temporarily. The method and system 1 according to the embodiment of the present invention can be used for automating the detection of anomalous work pieces during the production process using machine learning (deep learning) that is unspecific for the target process or target work pieces and which is applicable out of the box. The method and system 1 according to the embodiment of the present invention are data driven and can be used to automate quality control.

In the quality control system 1 according to the embodiment of the present invention, the data of each target work piece is processed on process level. The quality control system 1 uses data of a set of reference work pieces of representative good quality. This kind of data can be acquired since in any reasonable production the number of good quality products does exceed the amount of scrap products by a wide margin. In case the quality requirements are changed, a user has only to update the set of references or reference data for his production process.

In a possible embodiment, the raw sensor data provided by the data extraction pipeline of the manufacturing machine M can be recorded on a time base scale which results in a varying length of recordings (and number of data points) per work piece and per process step. Due to this fact, in a conventional system, the measurements have often been misaligned which harms comparability. For this reason, the preprocessing unit 2 of the quality control system 1 comprises in a possible embodiment a projection stage 2A where all measurements of the path length are projected along a trajectory which is common to all work pieces/process steps in the data. The path length L at a time step t can be defined as:

$$L(X, t) = \begin{cases} 0 & \text{if } t = 0 \\ \sum_{i=1}^{t} \sqrt{\sum_{A=0}^{2} (x_{i,A} - x_{i-1,A})^2} & \text{otherwise} \end{cases} \quad (1)$$

wherein X describes all three-dimensional coordinates on the trajectory of a process step and $x_{i,A}$ on a time step i on axis A. Given the path length L, it is possible to generate sequences of fixed lengths for every measurement channel by linearly interpolating between values and computing the linearly interpolated values in steps of e.g. 0.05 which may correspond e.g. to a path length L of 2 mm. Since process steps might also have slightly varying total path lengths L, in a possible implementation, the process step with the shortest total path length L from the reference set is used and the data generation of this path length L results in that all sequences have the exact same length.

In a possible embodiment, the filter 2B within the preprocessing unit 2 is used to smooth each signal. In a possible embodiment, the filter can be formed by a median filter with a window size of e.g. 11.

The computed deviation data signal or deviation feature forms a core component of the approach taken by the quality control system 1 according to the embodiment of the present invention. The use of deviation data signals accomplishes some of the heavy lifting required for the generalization across different processes and/or different work pieces. Given this feature, the learning problem can be reduced to finding a proper (potentially non-linear) threshold for deciding if at a time step t the target work piece and/or the production process step is anomalous or not, since it can be assumed that large amounts of the process-specific knowledge that would be required to assess an anomaly has been absorbed by the deviations from the distribution of process-specific references.

Figure 2:
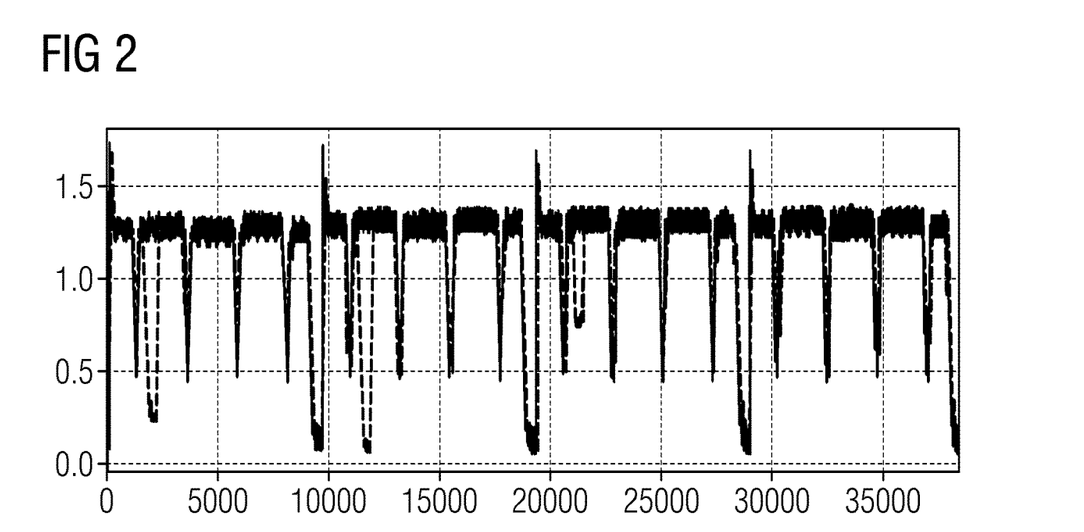
FIG. 2 shows a signal diagram for illustrating a possible exemplary embodiment of a method and system.

FIG. 2 shows a signal diagram of a target data signal and a reference data signal for a path length L. In the illustrated exemplary signal diagram, the signal is a torque of a spindle of a manufacturing machine M used for a roughing process step. The reference data signals represent signals recorded from reference work pieces during a corresponding production process step previously performed when manufacturing the respective reference work piece. As can be seen in the example of FIG. 2, the target data signal tds of the current work piece may comprise notches with respect to the reference data signals resulting in high amplitudes of the deviation data signal dds as illustrated in the signal diagram of FIG. 3.

Figure 3:
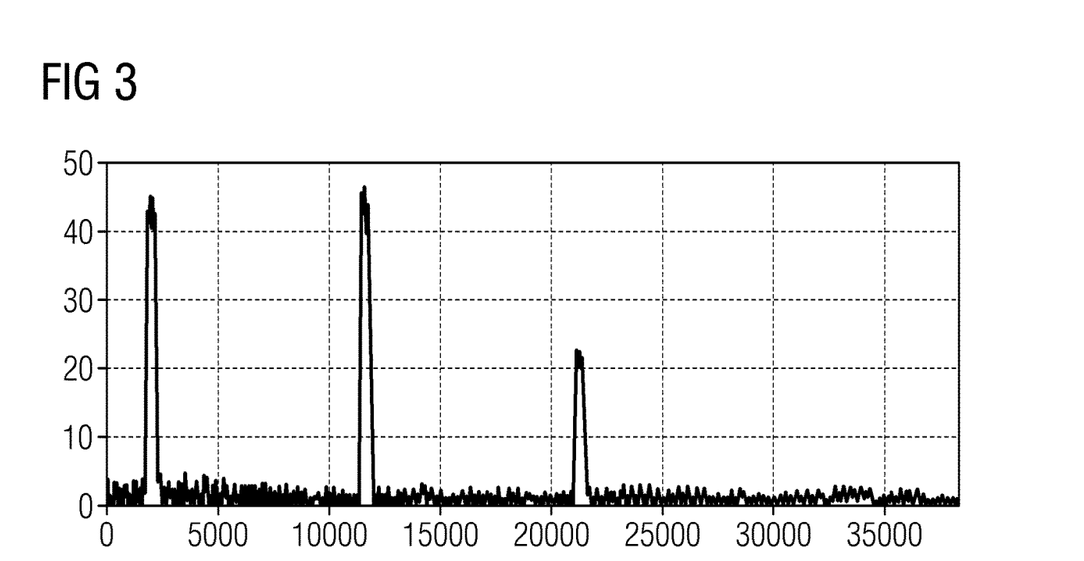
FIG. 3 shows a further signal diagram for illustrating a possible exemplary embodiment of a method and system.

The deviation data signal can be derived from the target data signal by computing in a possible embodiment a local normalized Euclidian distance to the set of reference work pieces for every step of the target data signal e.g. by:

$$\delta_{w,c,t} = \frac{|x_{w,c,t} - \overline{\mu}_{c,t-k:t+k}|}{\overline{\sigma}_{c,t-k:t+k}} \quad (2)$$

wherein $x_{w,c,t}$ describes the signal in a process step of work piece w for sensor signal channel c at step (path length) t, 1.

$$\overline{\mu}_{c,t-k:t+k} = E[\overline{X}_{:,c,t-k:t+k}] \quad (3)$$

is the local signal mean and $$\overline{\sigma}_{c,t-k:t+k} = E[\overline{X}_{:,c,t-k:t+k} - \overline{\mu}_{c,t-k:t+k}] \quad (4)$$

is the local signal standard deviation in the interval if [t−k, t+k] of sensor signal channel c of all reference work pieces from the same process step only. For instance, k can be k=25 corresponding to a window size of 2×25+1=51.

Since the local signal standard deviation can be almost zero or very small in some regions, meaning that the variation in signal observed throughout all references is very narrow, it is possible in a possible implementation to clip it to a 10-percentile of observed local standard deviations throughout the whole sequence for achieved numerical stability.

For the anomaly detector, the deviation data signals are computed for all available signals or a suitable subset of available signals. It is possible to compute a feature that indicates to what class of process the observed data belongs to (e.g. roughing or finishing).

The anomaly detection unit 3 can use a machine learning based model that is trained based on the received input data with the task to assess for each step of the 3D trajectory of the machining if it is anomalous or not.

The anomaly detection data model is a trained data model. Since a direct detection of anomalous work pieces using a global work piece/process-wise labeling is infeasible using supervised learning, one can exploit an auxiliary task which when solved properly also solves the actual target task of detecting anomalous work pieces. An anomalous signal can be compared against a set of reference data signals. It is possible to get a single label for the complete signal labeling it as bad resulting in one single training example. However, if every single step is labeled, one can generate a high number, e.g. 500, training examples. If one step is labeled as anomalous, the whole work piece and/or process step can be considered as anomalous. Using this strategy, it is possible to increase the amount of examples for training the anomaly detection data model in orders of magnitude going from hundreds to millions. This requires a more rigorous labeling of each work piece. This labeling can be automatically provided by specific software written for a set of training processes and/or work pieces.

In a possible embodiment, the anomaly detection data model of the anomaly detection unit 3 can comprise a dilated convolution based model. Dilated convolutions (also called convolution with holes) are convolutions with sparse filters that exhibit an exponential growth in the respective field when applied in a sequence. These operators are especially useful when processing large inputs with spatial or temporal dependencies by keeping the number of free parameters low.

In an alternative embodiment, the anomaly detection data model can also comprise a long-term short-term LSTM network which is a kind of recurrent neural network RNN that is capable to remember patterns of arbitrary intervals. For this reason, it is especially applicable to high resolution time series data where data patterns might evolve over a large amount of time steps.

FIG. 4 illustrates a possible embodiment of an anomaly detection unit 3 implementing as an anomaly detection data model an LSTM network. In the illustrated exemplary implementation, the anomaly detection data model is fed with a local window of e.g. 100 steps of data (i.e. deviation features+process type indicator PTI). The anomaly detection data model assigns a probability that a current time step is anomalous. The supplied deviation data signals can comprise e.g. a torque signal of a manufacturing machine M. The output of the anomaly detection unit 3 implementing the anomaly detection data model, in particular the LSTM neural network illustrated in FIG. 4, is an anomaly probability p that the respective time step t (or path length step l) is anomalous. In the embodiment shown in FIG. 4, the anomaly detection data model is fed with 100 steps of data, i.e. deviation data signals+process type indicator PTI features, to estimate a probability for the current time step t to be anomalous. In a possible embodiment, the network parameters are optimized to minimize an error in this probability estimate using e.g. a regularized mean binary cross entropy loss given by:

$$\text{loss}_\Theta(X, y) = -\frac{1}{n}\sum_i^n y_i \log f_\Theta(X_i) + (1 - y_i) \log(1 - f_\Theta(X_i)) + \lambda \|\Theta\|_2^2 \quad (5)$$

wherein X is the input data, y is a vector of binary labels, $f_\Theta$ is the model function parameterized by $\theta$ and $\lambda$ is a regularization strength. In a possible implementation, $\lambda$ can be set to 0.001.

The output probabilities generated by the anomaly detection unit 3 are supplied to the classification unit 4 of the quality control system 1. The classification unit 4 is adapted to classify the target work piece and/or the production process step as being anomalous or not anomalous on the basis of the received anomaly probabilities of the time steps t or path length steps l.

In a possible embodiment for classifying a whole process and/or a work piece as anomalous, it is possible to apply a simple classification rule such as:

$$f(P(x)) = \begin{cases} 1 & \text{if } \max_{x_i}(P(x_i)) > 0.95 \\ 0 & \text{otherwise} \end{cases} \quad (6)$$

wherein P(x) indicates the classification probabilities for the anomaly class generated by the classification model. $P(x_1)$ is the probability for the anomaly class at step i on the trajectory. In other words, the applied rule states that if the stepwise classification model predicts an anomaly with a high confidence of e.g. (>0.95) at any step, we might classify the whole work piece as anomalous. Alternatively, it is possible to learn a function to perform this classification if sufficient examples are available.

The quality control system 1 according to the embodiment of the present invention is near real-time capable and can estimate the stepwise probabilities of e.g. one second of data (at 500 Hz sampling rate), in e.g. 420 ms. This means that the quality control system 1 according to the embodiment of the present invention is almost twice as fast as the data recording. The time includes the computation of the deviation features, and with an increased batch size, the efficiency of the quality control system does further rise due to computational efficiency of the underlying linear algebra libraries.

The method and system 1 according to the embodiment of the present invention do not require any knowledge about the target process at hand, leading to a solution which is very general in its applicability and can for this reason scaled easily.

Figure 5:
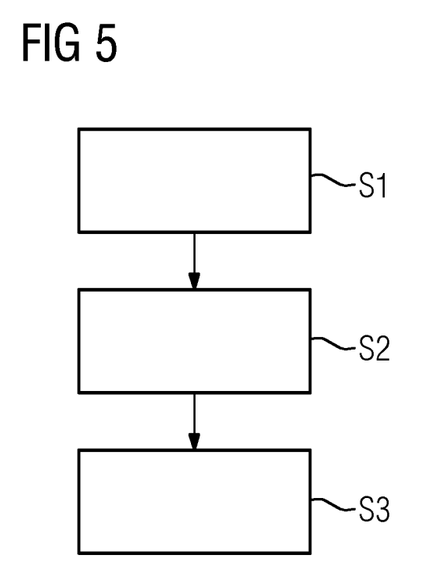
FIG. 5 shows a flowchart for illustrating a possible exemplary embodiment of a data driven method for automated detection of anomalous work pieces during a production process.

FIG. 5 shows a flowchart of a possible exemplary embodiment of a data driven method for automated detection of anomalous work pieces during a production process according to an aspect of the embodiment of the present invention.

In the illustrated exemplary embodiment, the data driven method comprises three main steps as shown in FIG. 5.

In a first step S1, for each production process step of the production process at least one deviation data signal for a target data signal of a target work piece with respect to reference data signals recorded for a corresponding production process step of a set of reference work pieces is computed. The computed deviation data signal comprises a number of deviation data samples for different production time steps t and/or path length steps l of the respective production process step.

In a further main step S2, a stepwise anomaly detection is performed by a data processing of the at least one computed deviation data signal and a process type indicator PTI indicating a type of the production process step using a trained anomaly detection data model to calculate for each time step t or path length step l of the production process step an anomaly probability p that the respective time step t or path length step l is anomalous.

In a final main step S3, the target work piece and/or the production process step is classified as being anomalous or not anomalous on the basis of the calculated anomaly probabilities of the time steps t or path length steps l of the production process step. Depending on the classification performed in step S3, a warning and/or a control signal can be generated.

The data driven method according to the embodiment of the present invention can implicitly acquire a large amount of process-specific knowledge automatically through the set of reference work pieces. These references can provide a statistic on how a process can run and any significant deviation from these references can be considered as abnormal. Defining a set of reference work pieces is in a common machining process comparatively easy. A suitable auxiliary learning task can be defined that implicitly solves the target task of detecting abnormal work pieces but for which it is relatively easy to generate a sufficient amount of training data. Further, a (non-linear) decision boundary for distinguishing abnormal machining process steps for normal machining process steps can be learned from an independent offline data set that does not have to include any data from the target process. The quality control system 1 according to the embodiment of the present invention is not just able to detect if a work piece as a whole is abnormal, but can also point out to the regions on the work piece where the abnormalities were observed. In this way, a manual quality control cannot only be guided to the abnormal work pieces during production, but can also be guided to the hotspots of abnormality on the work piece in question. The quality control system 1 according to the embodiment of the present invention can be used for guided quality control, opposed to scheduled quality control, in an industrial manufacturing facility that is also scalable. The quality control system 1 and method according to the embodiment of the present invention can dramatically decrease the reaction time of a running production process to deficiencies occurring during the production process. Consequently, also the amount of abnormal products produced in the production process can be reduced significantly. Especially, for a high quantity and mass production process, this advantage becomes attractive since every work piece can be controlled based on high resolution data.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A data driven method for automated detection of anomalous work pieces during a production process, the method comprising:
   (a) computing for each production process step of the production process at least one deviation data signal for a target data signal of a target work piece with respect to reference data signals recorded for a corresponding production process step of a set of reference work pieces, wherein the at least one deviation data signal comprises a number of deviation data samples for different production time steps, t, or path length steps, l, of the respective production process step;
   (b) performing a stepwise anomaly detection by data processing of the at least one computed deviation data signal and a process type indicator indicating a type of the production process step using a trained anomaly detection data model to calculate for each time step, t, or path length step, l, of the production process step an anomaly probability, p, that the respective time step, t, or path length step, l, is anomalous; and
   (c) classifying the target work piece and/or the production process step as being anomalous or not anomalous on the basis of the calculated anomaly probabilities, p, of the time steps, t, or path length steps, l, of the production process step.

2. The method according to claim 1, wherein measurement data of the production process step are recorded as time step, t, or path length step, l, based measurement data with a varying number of data samples per target work piece and/or process step.

3. The method according to claim 2, wherein recorded time step or path length based measurement data are converted into three-dimensional path length based data by projecting the time step based measurement data on a path length, L, along a trajectory common to all work pieces during the production process step.

4. The method according to claim 3, wherein the three-dimensional path length based data are smoothed by a data filter to provide the target data signal of the target work piece and reference data signals of reference work pieces.

5. The method according to claim 4, wherein the at least one deviation data signal is computed by calculating a normalized Euclidian distance between the smoothed target data signal of the target work piece output by the data filter and a signal mean and standard deviation of the recorded reference data signals for a moving window having a predetermined window size.

6. The method according to claim 1, wherein an error of the calculated anomaly probability is minimized by optimizing network parameters of the anomaly detection data model using a calculated binary cross entropy loss.

7. The method according to claim 1, wherein the automated detection of anomalous work pieces and/or anomalous production process steps is performed in real time during the running production process comprising the process steps.

8. The method according to claim 1, wherein the anomaly detection data model comprises a dilated convolution based data model.

9. The method according to claim 1, wherein the anomaly detection data model comprises a recurrent neural network (RNN), a Long-Term-Short-Term (LSTM) network, or a gated recurrent unit (GRU) network.

10. The method according to claim 1, wherein if the target work piece and/or the production process step is classified as anomalous, a warning signal for a user and/or a control signal for a production machine is generated automatically.

11. A system comprising:
    a quality control system configured to:
        receive a target data signal of a target work piece processed in a production process by a production machine;
        compute for each production process step of the production process at least one deviation data signal for the received target data signal with respect to reference data signals recorded for a corresponding production process step of a set of reference work pieces, wherein the at least one deviation data signal comprises a number of deviation data samples for different production time steps, t, or path length steps, l, of the respective production process step;
        perform a stepwise anomaly detection by data processing of the at least one deviation data signal and a process type indicator indicating a type of the production process step using a trained anomaly detection data model to calculate for each time step, t, or path length step, l, of the production process step an anomaly probability, p, that the respective time step, t, or path length step, l, is anomalous;
        classify the target work piece and/or the production process step as being anomalous or not anomalous on the basis of the calculated anomaly probabilities, p, of the time steps, t, or path length steps, l, of the production process step; and issue a generated warning signal and/or a generated control signal, if the target work piece and/or the production process step is classified as anomalous.

12. The system according to claim 11, wherein the reference data signals recorded for a corresponding production process step for a set of reference work pieces are stored in a memory read by the data preprocessing unit to compute for each production process step of the production process at least one deviation data signal supplied to the anomaly detection unit.

13. The system according to claim 11, wherein the target data signal of a target work piece processed in the production process comprises measurement data generated by sensors of the production machine.

14. The system according to claim 13, wherein the measurement data is provided by a data extraction pipeline of the production machine and recorded on a time base scale per work piece and per process step of the production process.

15. The system according to claim 11, wherein the processor is configured to convert recorded time step based measurement data into three-dimensional path length based data by projecting the time step based measurement data on a path length, L, along a trajectory common to all work pieces during the production process step of the production process.

* * * * *